US009874251B2

(12) United States Patent
Dattawadkar et al.

(10) Patent No.: US 9,874,251 B2
(45) Date of Patent: Jan. 23, 2018

(54) REDUCED VOLUME STRUT FOR ROCKER ONE-WAY CLUTCH (71) Applicant: Schaeffler Technologies AG & Co. KG, Herzogenaurach (DE)

(72) Inventors: Aditya Dattawadkar, Wooster, OH (US); Jacob Rufener, Orrville, OH (US)

(73) Assignee: Schaeffler Technologies AG & Co. KG, Herzogenhaurach (DE)

( * ) Notice: Subject to any disclaimer, the term of this patent is extended or adjusted under 35 U.S.C. 154(b) by 183 days.

(21) Appl. No.: 14/878,255

(22) Filed: Oct. 8, 2015

(65) Prior Publication Data
US 2017/0102039 A1    Apr. 13, 2017

(51) Int. Cl.
*F16D 11/00* (2006.01)
*F16D 41/12* (2006.01)
*F16H 45/00* (2006.01)
F16D 41/06 (2006.01)
F16D 121/14 (2012.01)

(52) U.S. Cl.
CPC .............. *F16D 41/12* (2013.01); *F16H 45/00* (2013.01); *F16D 2041/0603* (2013.01); *F16D 2121/14* (2013.01)

(58) Field of Classification Search
CPC .......................... F16D 41/12; F16D 2121/14
See application file for complete search history.

(56) References Cited

U.S. PATENT DOCUMENTS

| 5,176,232 | A | 1/1993 | Malecha |
| 8,881,516 | B2 | 11/2014 | Bird et al. |
| 9,091,312 | B2 | 7/2015 | Lindemann et al. |
| 2009/0266667 | A1* | 10/2009 | Samie ............... F16D 41/12 192/43.1 |
| 2014/0062174 | A1* | 3/2014 | Chen ............... B60B 27/047 301/110.5 |
| 2014/0326566 | A1* | 11/2014 | Lindemann ............ F16D 41/12 192/45.1 |
| 2016/0017937 | A1* | 1/2016 | McConnell ............ F16D 41/12 192/45.1 |
| 2016/0091035 | A1* | 3/2016 | Dattawadkar ........... F16H 41/24 192/46 |

* cited by examiner

Primary Examiner — David J Hlavka
(74) Attorney, Agent, or Firm — LeKeisha M. Suggs (57) ABSTRACT A strut for a rocker one-way clutch comprising: a body having: a center point; an outer circumferential edge having a first radius with respect to the center point; and, an inner circumferential edge having a second radius with respect to the center point; and, a retention segment having: a neck portion directly connected to the body and extending from the body in a first direction; and, a spring retention portion extending from the neck portion. Also discloses is a rocker one-way clutch comprising: an axis of rotation; an outer race including at least one pocket; an inner race; a strut as above, wherein the body is at least partially locatable in the pocket.

18 Claims, 7 Drawing Sheets

REDUCED VOLUME STRUT FOR ROCKER ONE-WAY CLUTCH

FIELD

The invention relates generally to a stator and more particularly to a rocker one way clutch installed in the stator of a torque converter.

BACKGROUND

Torque converters typically include an impeller, a stator, and a turbine, each of which include blades to direct hydraulic fluid flow. Stators may include roller one way clutches or rocker one way clutches. U.S. Pat. No. 5,176,232 discloses roller one-way clutches including a hollow roller or a ceramic roller to reduce mass. U.S. Pat. No. 8,881,516 discloses a stator formed with pockets for receiving rockers. U.S. Pat. No. 9,091,312 discloses a one-way clutch comprising symmetrical struts.

BRIEF SUMMARY

Example aspects broadly comprise a strut for a rocker one-way clutch comprising: a body having: a center point; an outer circumferential edge having a first radius with respect to the center point; and, an inner circumferential edge having a second radius with respect to the center point; and, a retention segment having: a neck portion directly connected to the body and extending from the body in a first direction; and, a spring retention portion extending from the neck portion. In an example aspect, the body further comprises: an outer circumferential surface having a first depth; and, an inner circumferential surface having a second depth. In an example aspect, the first depth is greater than or equal to the second depth. In an example aspect, the second depth is at most equal to the first depth, and the body further includes a protrusion having a third depth and extending from the body in a second direction orthogonal to the first direction. In an example aspect, the body further comprises a wall having: a thickness, wherein the thickness equals the first radius less the second radius; and, a first surface disposed between the outer circumferential edge and the inner circumferential edge. In an example aspect, the retention segment further comprises first and second edges parallel to the first direction and contiguous with the inner circumferential edge, and a third edge, orthogonal to the first direction, connecting the first and second edges. In an example aspect, the inner circumferential edge is contiguous with a top surface, a base surface, or both.

Other example aspects broadly comprise a one way clutch for a stator comprising: an axis of rotation; the strut as above; an outer race including a pocket wherein the body is at least partially locatable in the pocket. In an example aspect, the body further comprises: an outer circumferential surface having a first depth; and, an inner circumferential surface having a second depth. In an example aspect, the first depth is greater than or equal to the second depth. In an example aspect, the second depth is at most equal to the first depth, and the body further includes a protrusion having a third depth and extending from the body in a second direction orthogonal to the first direction.

Other example aspects broadly comprise a strut and strut pocket pair for a rocker one-way clutch comprising: a strut including: a body having: a center point; an outer circumferential edge having a first radius with respect to the center point and adjacent to an outer circumferential surface having a first depth; an inner circumferential edge having a second radius with respect to the center point and adjacent to an inner circumferential surface having a second depth; a retention segment having: a neck portion directly connected to the body and extending from the body in a first direction; and, a spring retention portion extending from the neck portion; and, a pocket in an outer race wherein the body is at least partially locatable in the pocket. In an example aspect, the first depth is greater than or equal to the second depth. In an example aspect, the second depth is at most equal to the first depth and the body further includes a protrusion having a third depth and extending from the body in a second direction orthogonal to the first direction, and wherein the pocket includes a recess, having a fourth depth at least equal to the third depth, for receiving the protrusion. In an example aspect, the protrusion includes an intermediate circumferential surface having the third depth. In an example aspect, the strut body inner circumferential edge is contiguous with a base surface and the first depth is greater than the second depth; and wherein, the pocket includes a protrusion, having a depth at most equal to the second depth, matingly engageable with the base surface, the inner circumferential surface, and an intermediate surface.

Other example aspects broadly comprise a rocker one-way clutch comprising: an axis of rotation; an outer race including at least one pocket; an inner race; a strut including: a body having: a center point; an outer circumferential edge having a first radius with respect to the center point and adjacent to an outer circumferential surface having a first depth; an inner circumferential edge having a second radius with respect to the center point and adjacent to an inner circumferential surface having a second depth; a retention segment having: a neck portion directly connected to the body and extending from the body in a first direction; and, a spring retention portion extending from the neck portion; and, wherein the body is at least partially locatable in the pocket. In an example aspect, the first depth is greater than or equal to the second depth. In an example aspect, the second depth is at most equal to the first depth and the body further includes a protrusion having a third depth and extending from the body in a second direction orthogonal to the first direction, and wherein the pocket includes a recess having a depth at least equal to the third depth for receiving the protrusion; and, wherein the protrusion includes an outer circumferential surface having the third depth. In an example aspect, the strut body inner circumferential edge is contiguous with a base surface and the first depth is greater than the second depth; and wherein the pocket includes a protrusion, having a depth at most equal to the second depth, matingly engageable with the base surface, the inner circumferential surface, and an intermediate surface.

BRIEF DESCRIPTION OF THE DRAWINGS

The nature and mode of operation of the present invention will now be more fully described in the following detailed description of the invention taken with the accompanying drawing figures, in which:

FIG. 5A-5D illustrate cross-sectional views of various embodiments of body portions according to example aspects including.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Strut lift off capability at lower RPMs, or revolutions per minute, in combination with reduced contact stresses, are desirable for improved performance and durability of struts in rocker one-way clutches for torque converters. Without being bound by theory, it is believed that the reduced volume, and thus reduced mass, of the strut results in lower inertia, reducing the lift-off speed of the strut which allows lower spring force. Reduced mass also results in lower contact stresses. Hollowness, or lower volume, of the struts in an example aspect provides more flexibility within the strut and, therefore, allows more contact area thus reducing the compressive stress. The amount of hollowness can be tailored for each application depending on loading condition, and in an example aspect, hollowness of the struts is introduced in terms of reduction in total volume percent. In an example aspect, introducing hollowness in the strut in a range of at least 0.1 volume % and at most 75 volume % typically improves the stress conditions. In other words, lower compressive stress are achieved without increasing tensile stress beyond yield or fatigue limit values. Additionally, reduced mass of the strut accommodates vehicle weight reduction efforts, beneficial for improved fuel economy for example, and provides a commercial and environmental benefit by limiting raw material usage.

In an example aspect, anti-reversal or poka-yoke feature (s) provide ease of assembly and improved production quality. In an example aspect, features such as a protrusion or a blind hole in the strut ensures proper rocker orientation of the assembly when matingly engaging the strut with a pocket of an outer race.

Figure 1:
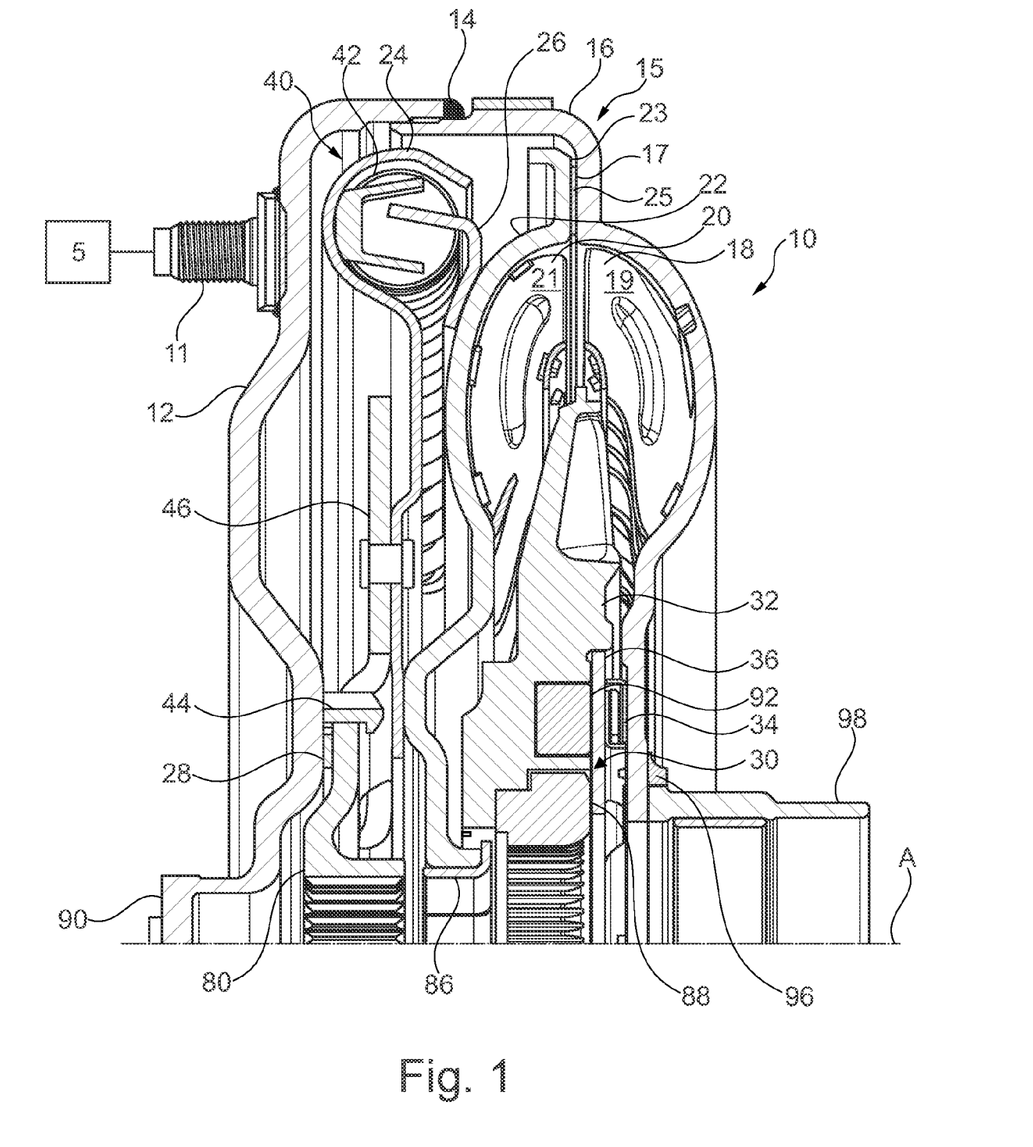
FIG. 1 illustrates a partial cross-sectional view of a torque converter including a one-way rocker clutch with reduced volume struts in a stator in an example aspect.

The following description is made with reference to FIGS. 1-8. FIG. 1 illustrates a non-limiting example of a torque converter in an example aspect. As one skilled in the art appreciates, a rocker one-way clutch featuring reduced volume struts as in an example aspect are useful in a variety of torque converter designs.

FIG. 1 illustrates a partial cross-sectional view of a torque converter including a one-way rocker clutch with reduced volume struts in a stator in an example aspect. Torque converter 10 includes front cover 12 for connecting to a crankshaft of internal combustion engine 5 via stud 11 and rear cover 16, also referred to as impeller shell interchangeably herein, for an impeller 18. Impellers are also referred to in the art interchangeably as 'pump'. Front cover 12 and rear cover 16 are fastened together via weld 14. Cover 12 includes cover pilot portion 90. Torque converter 10 also includes turbine 20, turbine shell 22, and stator 32 between turbine 20 and impeller 18. Turbines and impellers, as is known in the art, include a plurality of blades 21 and 19, respectively. Torque converter 10 of FIG. 1 includes clutch 15 including extended portion 23 of turbine shell 22, also referred to as turbine piston 23 or clutch plate 23 interchangeably herein. In an example aspect, impeller shell 16 includes inner portion 17, also referred to as apply plate 17 interchangeably herein. Friction material 25 is disposed between clutch plate 23 and apply plate 17. Friction material 25 is attached to clutch plate 23, to apply plate 17, or to both.

Torque converter 10 includes one-way clutch 30, which supports stator 32 and includes inner race 88 and a rocker or outer race 92. Side plate 36 holds one-way clutch 30 in place within stator 32. Thrust bearing 34 is situated between side plate 36 and impeller shell 16. Torque converter 10 also includes damper assembly 40, which is connected to and drivable by turbine 20, and is positioned between turbine 20 and front cover 12. Damper assembly 40 includes springs 42, flange 46, first cover plate 24, and second cover plate 26, fixed to turbine shell 22. Springs 42 are at least partially disposed between cover plates 24 and 26. Cover plates 24 and 26 may include window openings as are known in the art to accommodate the springs. Damper assembly 40 optionally includes bushing 44 and thrust washer 28. In an example aspect, flange 46 axially thrusts against or is axially supported by cover 12 via bushing 44 supporting thrust washer 28. Thrust washer 28 is attached to cover 12 by methods known in the art, such as projection welding, for example. Torque converter 10 further includes hub 80 fixed to flange 46, bushing 86, weld 96, and hub 98. Transmission components spline, input shaft, and stator shaft are not shown. Hub 80 is splined to the input shaft and inner race 88 is splined to the stator shaft. Bushing 86 positions and at least partially seals turbine shell 22 on the input shaft. Torque converter 10 includes axis of rotation A, also simply referred to as axis A.

Figure 2:
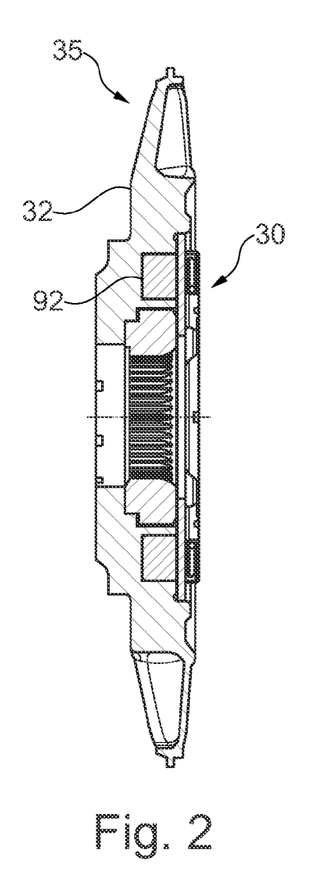
FIG. 2 illustrates a cross-sectional view of a stator assembly of the torque converter of FIG. 1 in an example aspect.
Figure 3:
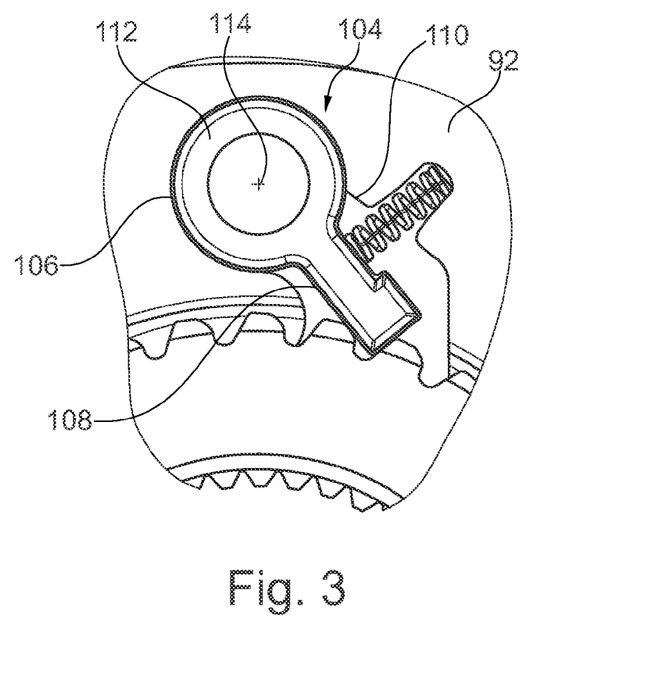
FIG. 3 illustrates a top view of a reduced volume strut in a pocket in an example aspect.

FIG. 2 is a cross-sectional view of a stator assembly of the torque converter of FIG. 1 in an example aspect. Stator assembly 35 includes one-way clutch 30 comprising outer race 92 and strut 104. In an example aspect, clutch 30 is part of stator 32 for a torque converter. The stator includes blades connected to outer race 92. In an example aspect, the outer race is located radially inward of the blades and is made of a same single piece of material as the blades. In an example aspect, stator 32 and outer race 92 are aluminum. FIG. 3 illustrates detail of strut 104 and the area adjacent thereto and is a a top view of a reduced volume strut in an example aspect. Strut 104 includes body 106 and retention segment 108. The body is at least partially locatable in pocket 110 of outer race 92. The strut includes top surface 112 with center point 114 in the body.

Figure 4A:
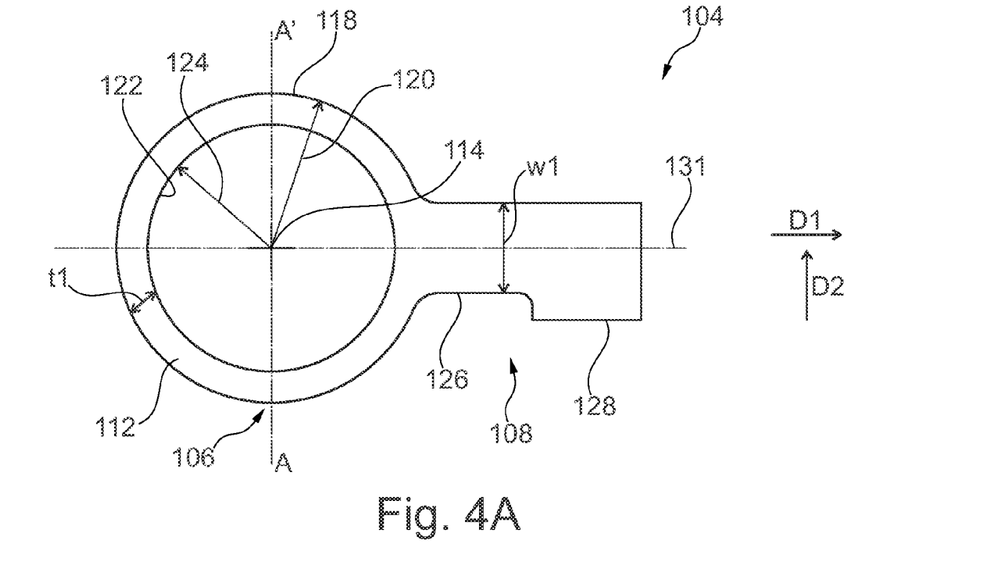
FIG. 4A illustrates a top view of a reduced volume strut in an example aspect.
Figure 4B:
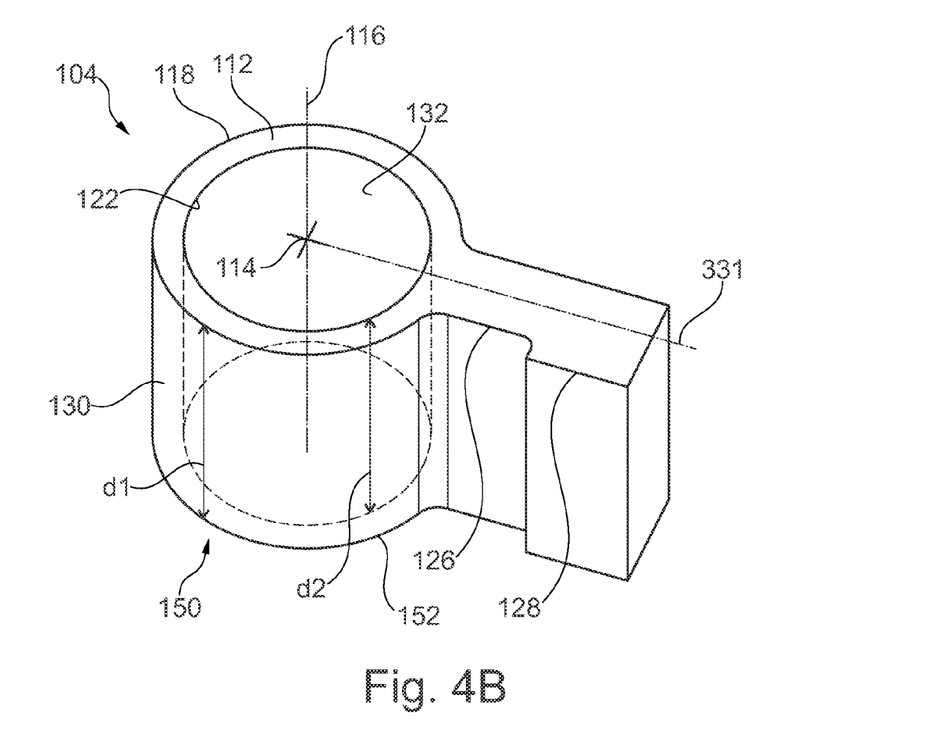
FIG. 4B illustrates a perspective view of a reduced volume strut in an example aspect.

FIG. 4A is a top view of a reduced volume strut according to an example aspect. Strut 104 includes axis 116 passing through center point 114 and is orthogonal to top surface 112. Body 106 includes outer circumferential edge 118 at distance 120 from the center point. Distances from the center point may also be referred to interchangeably herein as radius or radial distance. Thus, edge 118 forms a portion of a circle. The body includes inner circumferential edge 122 at distance 124 from the center point. Thus, edge 122 forms a portion of a circle. The volume radially inward of edge 122 relative to center point 114 and inner circumferential surface 132 relative to axis 116 is void space or hollowness resulting in a reduction of total volume for the strut of between about 0.1 and 75 volume percent. The retention segment includes neck portion 126 and spring retention portion 128. The neck portion is directly connected to the body and extends from the outer circumferential edge in direction D1. The neck portion includes width w1 in direction D2 orthogonal to line 131 along the top surface through the neck portion and the center point in direction D1. FIG. 4B is a perspective view of a reduced volume strut according to an example aspect further including outer circumferential surface 130 having depth d1, inner circumferential surface 132 having depth d2, and base portion 150 including base surface 152.

Figure 5A:
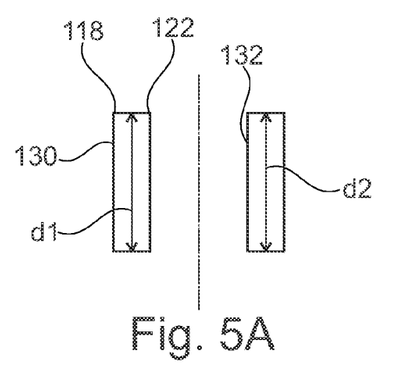
FIG. 5A showing a hollow body portion with depth d1 equal to depth d2.
Figure 5B:
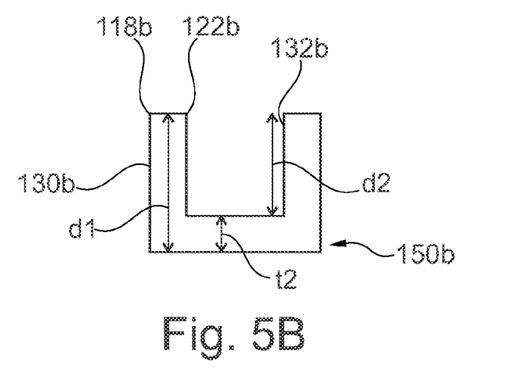
FIG. 5B showing a partial hollow body portion with depth d1 greater than depth d2.
Figure 5C:
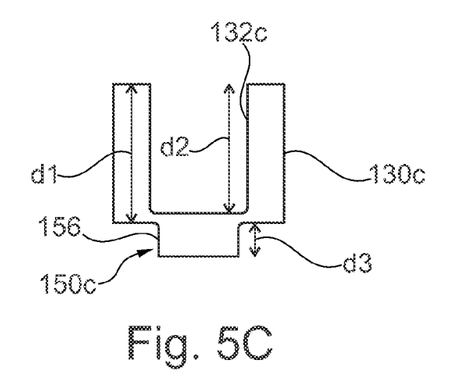
FIG. 5C showing a poka-yoke protrusion at base portion wherein depth d1 is less than the sum of depth d2 of the hollow portion plus depth d3 of the protrusion.
Figure 5D:
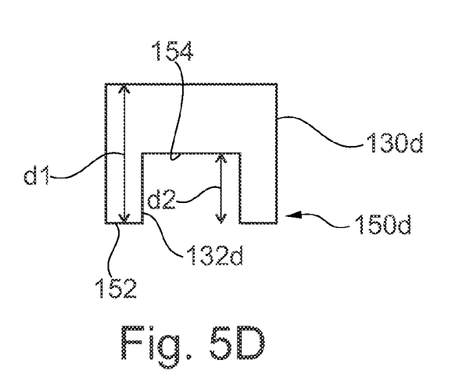
FIG. 5D showing a poka-yoke blind hollow wherein depth d1 is greater than depth d2 and the hollow portion is at the base of the strut.

FIG. 5A-5D are cross-sectional views of various embodiments of body portions cut along line A-A' of FIG. 4A according to example aspects. Base portions 150 as such are typically opposite the top surface and are for contacting the pocket. FIG. 5A shows a hollow body portion with depth d1 equal to depth d2. FIG. 5B shows a partial hollow body portion with depth d1 greater than depth d2 and including base portion 150b having thickness t2 equal to depth d1 less depth d2. FIG. 5C shows a poka-yoke protrusion at base portion 150c wherein depth d1 is less than the sum of depth d2 of the hollow portion plus depth d3 of protrusion 156. FIG. 5D shows a poka-yoke blind hollow wherein depth d1 is greater than depth d2 and the hollow portion is included at base portion 150d.

Figure 6:
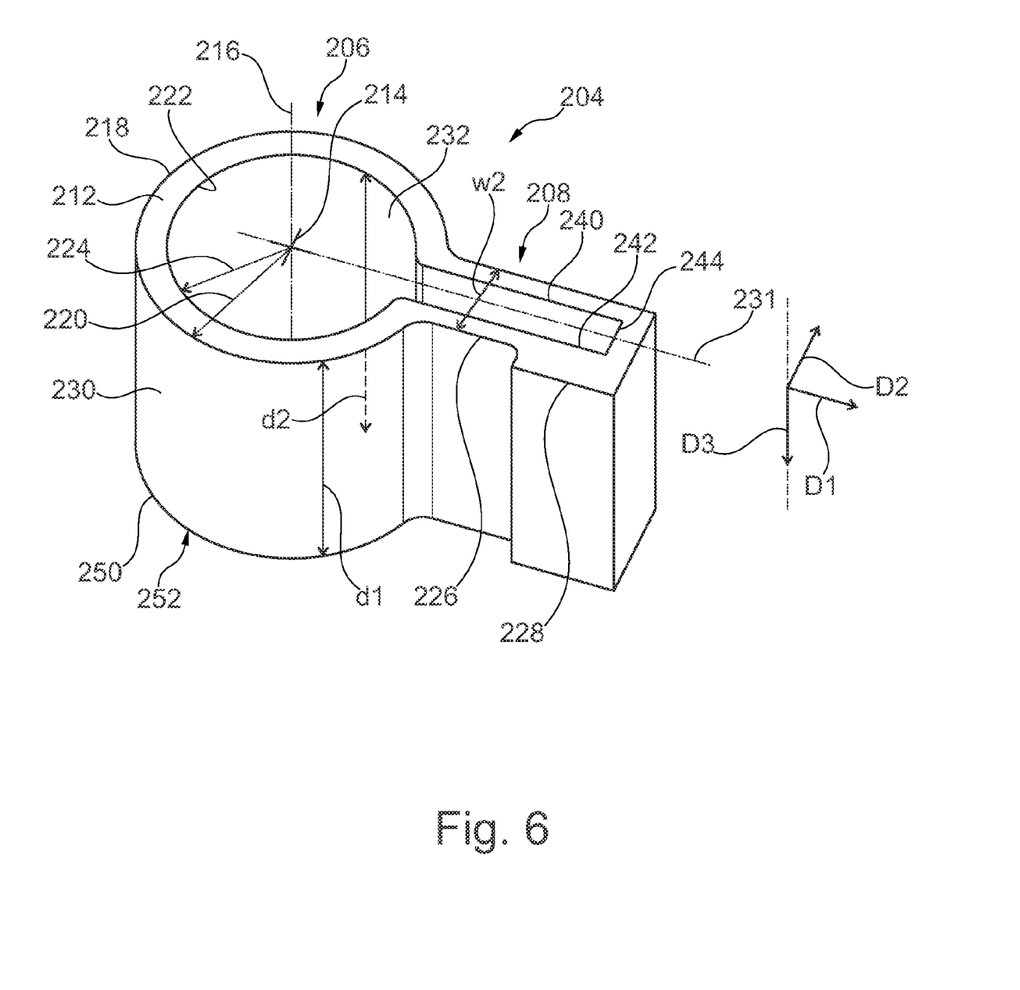
FIG. 6 illustrates a perspective view of a reduced volume strut including a hollow portion in both the body and the retention segment in an example aspect.

FIG. 6 is a perspective view of a reduced volume strut including a contiguous hollow portion in both the body and the retention segment in an example aspect. Strut 204 includes body 206 and retention segment 208. The body is at least partially locatable in a pocket of an outer race. The strut includes top surface 212 with center point 214 in the body. Strut 204 includes axis 216 passing through center point 214; axis 216 is orthogonal to top surface 212. Body 206 includes outer circumferential edge 218 at distance 220 from the center point. Thus, edge 218 forms a portion of a circle. The body includes inner circumferential edge 222 at distance 224 from the center point. Thus, edge 222 forms a portion of a circle. The volume radially inward of edge 222 relative to center point 214 and inner circumferential surface 232 relative to axis 216, further defined by the volume inward of edges 240, 242, and 244 relative to line 231, is void space or hollowness resulting in a reduction of total volume for the strut of between about 0.1 and 75 volume percent. The retention segment includes neck portion 226 and spring retention portion 228. The neck portion is directly connected to the body and extends from outer circumferential edge 218 in direction D1. The neck portion includes width w2 in direction D2 orthogonal to line 231 along the top surface through the neck portion and the center point in direction D1. Strut 204 further includes outer circumferential surface 230 having depth d1, inner circumferential surface 232 having depth d2, and base portion 250 including base surface 252. Depth d2 is at most equal to depth d1. A contiguous hollow portion in both body 206 and retention segment 208 includes inner first and second edges 240 and 242, parallel to first direction D1, and contiguous with inner circumferential edge 222; and, third edge 244, parallel to direction D2, and connecting first and second edges 240 and 242.

Figure 7A:
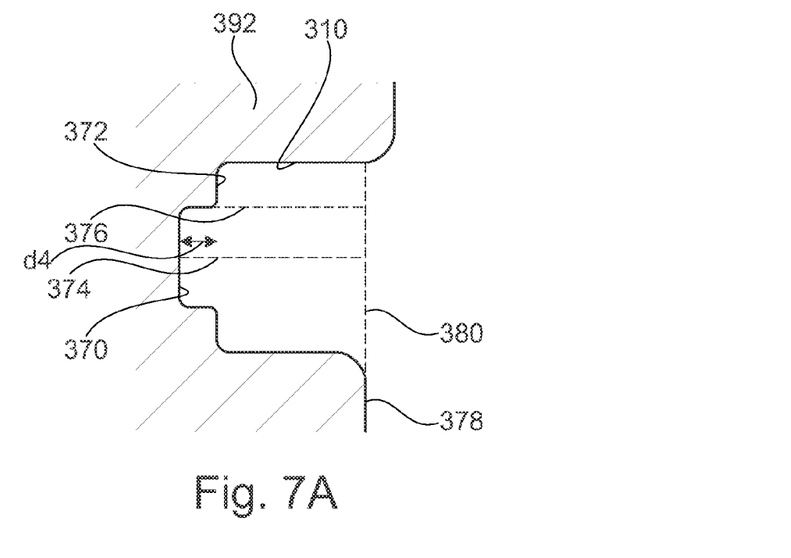
FIG. 7A illustrates a cross-sectional view of a strut pocket for a poka-yoke reduced volume strut according to an example aspect; and, FIG. 7B is a perspective view of the poka-yoke reduced volume strut to be received by the pocket of FIG. 7A. The strut of FIG. 7B includes a protrusion for mating engagement with the pocket of FIG. 7A.
Figure 7B:
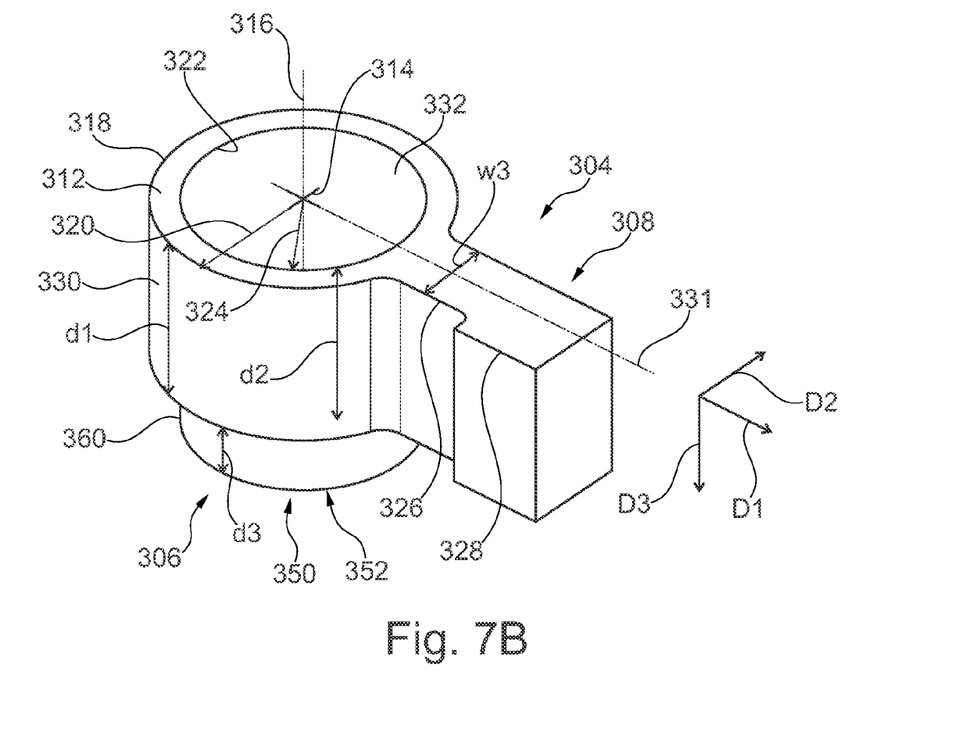

FIG. 7A is a cross-sectional view of a strut pocket for a poka-yoke reduced volume strut according to an example aspect; and, FIG. 7B is a perspective view of the poka-yoke reduced volume strut to be received by the pocket of FIG. 7A. The strut of FIG. 7B includes a protrusion for mating engagement with the pocket of FIG. 7A. In an example aspect, strut 304 of FIG. 7B fits, or is matingly engaged, with pocket 310 of FIG. 7A. Strut 304 includes body 306 and retention segment 308. The body is at least partially locatable in a pocket of an outer race, i.e. in pocket 310 of FIG. 7A. The strut includes top surface 312 with center point 314 in body 306. Strut 304 includes axis 316 passing through center point 314 and is orthogonal to top surface 312. Body 306 includes outer circumferential edge 318 at distance 320 from the center point. Thus, edge 318 forms a portion of a circle. The body includes inner circumferential edge 322 at distance 324 from the center point. Thus, edge 322 forms a portion of a circle. The volume radially inward of edge 322 relative to center point 314 and inner circumferential surface 332 is void space or hollowness resulting in a reduction of total volume for the strut of between about 0.1 and 75 volume percent. Retention segment 308 includes neck portion 326 and spring retention portion 328. The neck portion is directly connected to the body and extends from outer circumferential edge 318 and outer circumferential surface 330 in direction D1. The neck portion includes width w3 in direction D2 orthogonal to line 331 along the top surface through the neck portion and the center point in direction D1. Strut 304 further includes outer circumferential surface 330 having depth d1, inner circumferential surface 332 having depth d2, and base portion 350 including base surface 352 and intermediate circumferential surface 360 having depth d3. Depth d2 is at most equal to depth d1. Body 306 includes base portion or protrusion 350, including intermediate circumferential surface 360 having depth d3, extending from body 306 in direction D3. Direction D3 is orthogonal to directions D1 and D2. Pocket 310 disposed in outer race 392 includes recess 370 at a distance 374 from line 380 extending from pocket edge 378, and pocket intermediate surface 372 at a distance 376 from line 380. The difference between distance 374 and 376 defines a depth d4 of recess 370, which is greater than or equal to depth d3 of strut 304. This ensures strut 304 including protrusion 350 is accommodated, or in other words fits matingly or complementarily, in pocket 310.

Figure 8A:
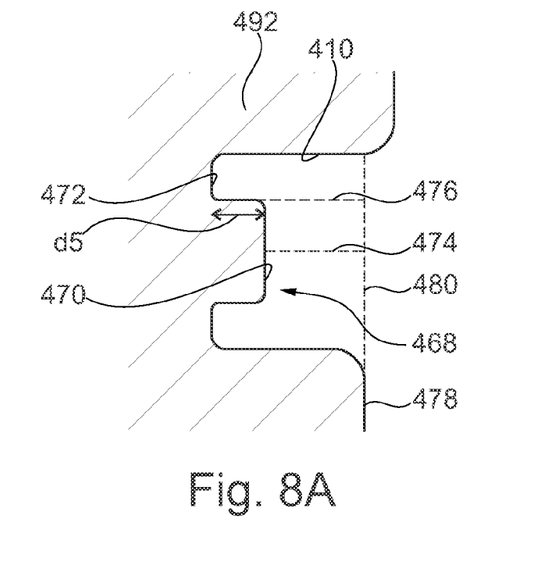
FIG. 8A illustrates a cross-sectional view of a strut pocket for a poka-yoke reduced volume strut according to another example aspect; and, FIG. 8B is a perspective view of the poka-yoke reduced volume strut to be received by the pocket of FIG. 8A. The strut of FIG. 8B includes a hollow base portion for mating engagement with a protrusion in the pocket of FIG. 8A.
Figure 8B:
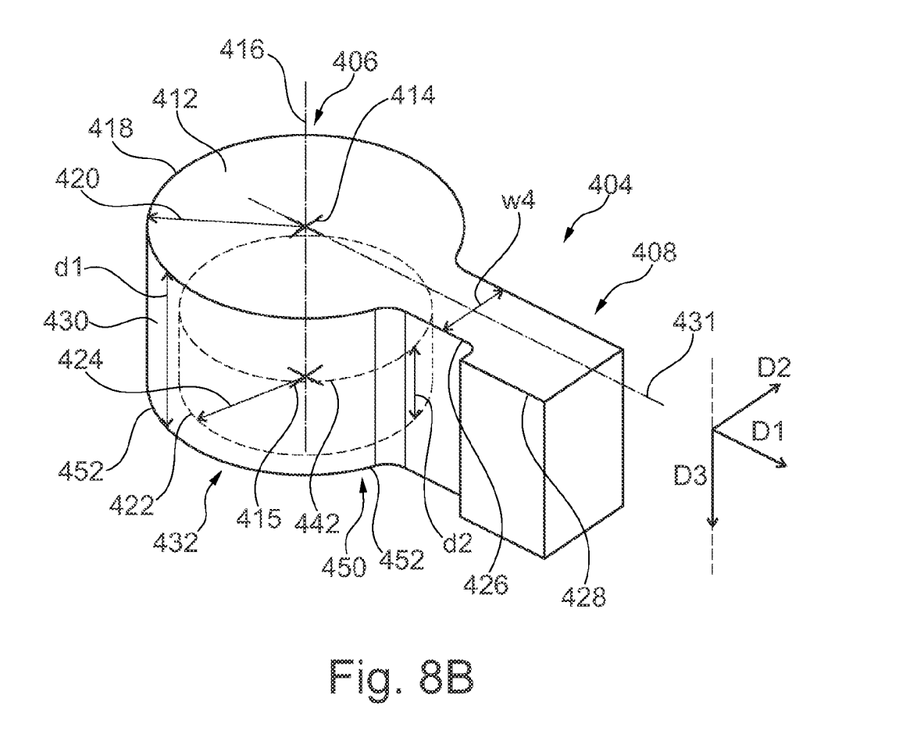

FIG. 8A is a cross-sectional view of a strut pocket for a poka-yoke reduced volume strut according to another example aspect; and, FIG. 8B is a perspective view of the poka-yoke reduced volume strut to be received by the pocket of FIG. 8A. The strut of FIG. 8B includes a hollow base portion for mating engagement with a protrusion in the pocket of FIG. 8A. In an example aspect, strut 404 of FIG. 8B fits, or is matingly engaged, with pocket 410 of FIG. 8A. Strut 404 includes top surface 412 with center point 414 in body 406. Strut 404 includes axis 416 passing through center point 414 and is orthogonal to top surface 412. Body 406 includes outer circumferential edge 418 at distance 420 from the center point. Thus, edge 418 forms a portion of a circle. The body includes inner circumferential edge 422 contiguous with bottom surface 452 at distance 424 from opposite center point 415, which is the center point of body 406 along axis 416 at base portion 450. Thus, edge 422 forms a portion of a circle. The volume radially inward of edge 422 relative to center point 415, inner circumferential surface 432, and intermediate surface 442 is void space or hollowness resulting in a reduction of total volume for the strut of between about 0.1 and 75 volume percent. Retention segment 408 includes neck portion 426 and spring retention portion 428. The neck portion is directly connected to the body and extends from outer circumferential edge 418 and outer circumferential surface 430 in direction D1. The neck portion includes width w4 in direction D2 orthogonal to line 431 along the top surface through the neck portion and the center point in direction D1. Strut 404 further includes outer circumferential surface 430 having depth d1, inner circumferential surface 432 having depth d2, and base portion 450 including base surface 452. Depth d2 is at most equal to depth d1. Strut pocket 410 disposed in outer race 492 further includes protrusion 468 having intermediate surface 470 at a distance 474 from line 480 extending from pocket edge 478, and bottom surface 472 at a distance 476 from line 480. Strut body inner circumferential edge 422 is contiguous with a base surface 452 and depth d1 is greater than depth d2. Protrusion 468 of pocket 410 therefore has depth d5 equal to distance 476 less distance 474. Pocket protrusion 468, having depth d5 at most equal to depth d2, is matingly engageable with base surface 452, inner circumferential surface 432, and intermediate surface 442 of strut 404.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A strut for a rocker one-way clutch comprising:
   a body having:
      a center point;
      an outer circumferential edge having a first radius with respect to the center point;
      an inner circumferential edge having a second radius with respect to the center point;
      an outer circumferential surface having a first depth;
      an inner circumferential surface having a second depth;
      a wall having a thickness equal to the first radius less the second radius; and
      a first surface disposed between the outer circumferential edge and the inner circumferential edge; and,
   a retention segment having:
      a neck portion directly connected to the body and extending from the body in a first direction; and,
      a spring retention portion extending from the neck portion.

2. The strut as in claim 1, wherein the first depth is greater than or equal to the second depth.

3. The strut as in claim 1, wherein the second depth is at most equal to the first depth, and the body further includes a protrusion having a third depth and extending from the body in a second direction orthogonal to the first direction.

4. The strut as in claim 1, wherein the retention segment further comprises first and second edges parallel to the first direction and contiguous with the inner circumferential edge, and a third edge, orthogonal to the first direction, connecting the first and second edges.

5. The strut as in claim 1, wherein the inner circumferential edge is contiguous with a top surface, a base surface, or both.

6. A one way clutch for a stator comprising:
   an axis of rotation;
   the strut as in claim 1; and,
   an outer race including a pocket wherein the body is at least partially locatable in the pocket.

7. The one way clutch as in claim 6, wherein the body further comprises:
   an outer circumferential surface having a first depth; and,
   an inner circumferential surface having a second depth.

8. The one way clutch as in claim 7, wherein the first depth is greater than or equal to the second depth.

9. The one way clutch as in claim 7, wherein the second depth is at most equal to the first depth, and the body further includes a protrusion having a third depth and extending from the body in a second direction orthogonal to the first direction.

10. A strut and strut pocket pair for a rocker one-way clutch comprising:
    a strut including:
       a body having:
          a center point;
          an outer circumferential edge having a first radius with respect to the center point and adjacent to an outer circumferential surface having a first depth;
          an inner circumferential edge having a second radius with respect to the center point and adjacent to an inner circumferential surface having a second depth;
          a wall having a thickness equal to the first radius less the second radius; and,
          a first surface disposed between the outer circumferential edge and the inner circumferential edge;
       a retention segment having:
          a neck portion directly connected to the body and extending from the body in a first direction; and,
          a spring retention portion extending from the neck portion; and,
    a pocket in an outer race wherein the body is at least partially locatable in the pocket.

11. The strut and strut pocket pair as in claim 10, wherein the first depth is greater than or equal to the second depth.

12. The strut and strut pocket pair as in claim 10, wherein the second depth is at most equal to the first depth and the body further includes a protrusion having a third depth and extending from the body in a second direction orthogonal to the first direction, and wherein the pocket includes a recess, having a fourth depth at least equal to the third depth, for receiving the protrusion.

13. The strut and strut pocket pair as in claim 12, wherein the protrusion includes an intermediate circumferential surface having the third depth.

14. The strut and strut pocket pair as in claim 10, wherein the strut body inner circumferential edge is contiguous with a base surface and the first depth is greater than the second depth; and wherein, the pocket includes a protrusion, having a depth at most equal to the second depth, matingly engageable with the base surface, the inner circumferential surface, and an intermediate surface.

15. A rocker one-way clutch comprising:
an axis of rotation;
an outer race including at least one pocket;
an inner race;
a strut including:
a body having:
a center point;
an outer circumferential edge having a first radius with respect to the center point and adjacent to an outer circumferential surface having a first depth;
an inner circumferential edge having a second radius with respect to the center point and adjacent to an inner circumferential surface having a second depth;
a wall having a thickness equal to the first radius less the second radius; and,
a first surface disposed between the outer circumferential edge and the inner circumferential edge;
a retention segment having:
a neck portion directly connected to the body and extending from the body in a first direction; and,
a spring retention portion extending from the neck portion; and,
wherein the body is at least partially locatable in the pocket.

16. The rocker one-way clutch of claim 15, wherein the first depth is greater than or equal to the second depth.

17. The rocker one-way clutch of claim 15, wherein the second depth is at most equal to the first depth and the body further includes a protrusion having a third depth and extending from the body in a second direction orthogonal to the first direction, and wherein the pocket includes a recess having a depth at least equal to the third depth for receiving the protrusion; and, wherein the protrusion includes an outer circumferential surface having the third depth.

18. The rocker one-way clutch of claim 15, wherein the strut body inner circumferential edge is contiguous with a base surface and the first depth is greater than the second depth; and wherein the pocket includes a protrusion, having a depth at most equal to the second depth, matingly engageable with the base surface, the inner circumferential surface, and an intermediate surface.

\* \* \* \* \*